United States Patent [19]

Koch et al.

[11] Patent Number: 5,038,258
[45] Date of Patent: Aug. 6, 1991

[54] ILLUMINATING ARRANGEMENT FOR ILLUMINATING AN OBJECT WITH INCIDENT LIGHT

[75] Inventors: Klaus-Peter Koch; Reinhard Prinz, both of Aalen, Fed. Rep. of Germany

[73] Assignee: Carl-Zeiss-Stiftung, Heidenheim, Fed. Rep. of Germany

[21] Appl. No.: 484,890

[22] Filed: Feb. 26, 1990

[30] Foreign Application Priority Data

Mar. 2, 1989 [DE] Fed. Rep. of Germany ....... 3906555

[51] Int. Cl.⁵ .............................................. F21V 33/00
[52] U.S. Cl. .................................. 362/237; 362/249; 362/252; 356/237; 359/656
[58] Field of Search ............... 362/227, 249, 252, 382, 362/11, 237, 240; 350/527, 523, 528; 382/8; 356/237

[56] References Cited

U.S. PATENT DOCUMENTS

| 4,450,579 | 5/1984 | Nakashima et al. | 382/8 |
| 4,567,551 | 1/1986 | Choate . | |
| 4,606,617 | 8/1986 | Muchel | 350/527 |
| 4,614,411 | 9/1986 | Horenz | 350/527 |
| 4,666,269 | 5/1987 | Nakamura et al. | |
| 4,706,168 | 11/1987 | Weisner . | |
| 4,821,157 | 4/1989 | Birk et al. | 362/237 |
| 4,895,223 | 1/1990 | Arnold | 362/252 |

FOREIGN PATENT DOCUMENTS 2852203 6/1980 Fed. Rep. of Germany .
3734691 4/1988 Fed. Rep. of Germany .
2042164 9/1980 United Kingdom .

OTHER PUBLICATIONS

"ABC der Optik" by Karl Mütze, Verlag Werner Dausien (1961), p. 561.

Primary Examiner—Ira S. Lazarus
Assistant Examiner—Richard R. Cole
Attorney, Agent, or Firm—Walter Ottesen

[57] ABSTRACT

The invention relates to an illuminating arrangement for illuminating an object with incident light wherein the angle of the incident light is selectable. The illuminating arrangement includes a plurality of individual light sources which can be switched on and off. The light sources are advantageously arranged in several concentric circles in different planes from which the light can be radiated along different beam axes. An illumination at different selectable angles is possible without a mechanical adjustment of the light sources or the imaging elements. The light sources can be advantageously mounted in a hemispherically-shaped carrier. The illuminating arrangement can be a component of a closed control loop and be controlled quickly and completely automatically via an image processing unit or by manual instructions of desired values via a control console.

15 Claims, 6 Drawing Sheets

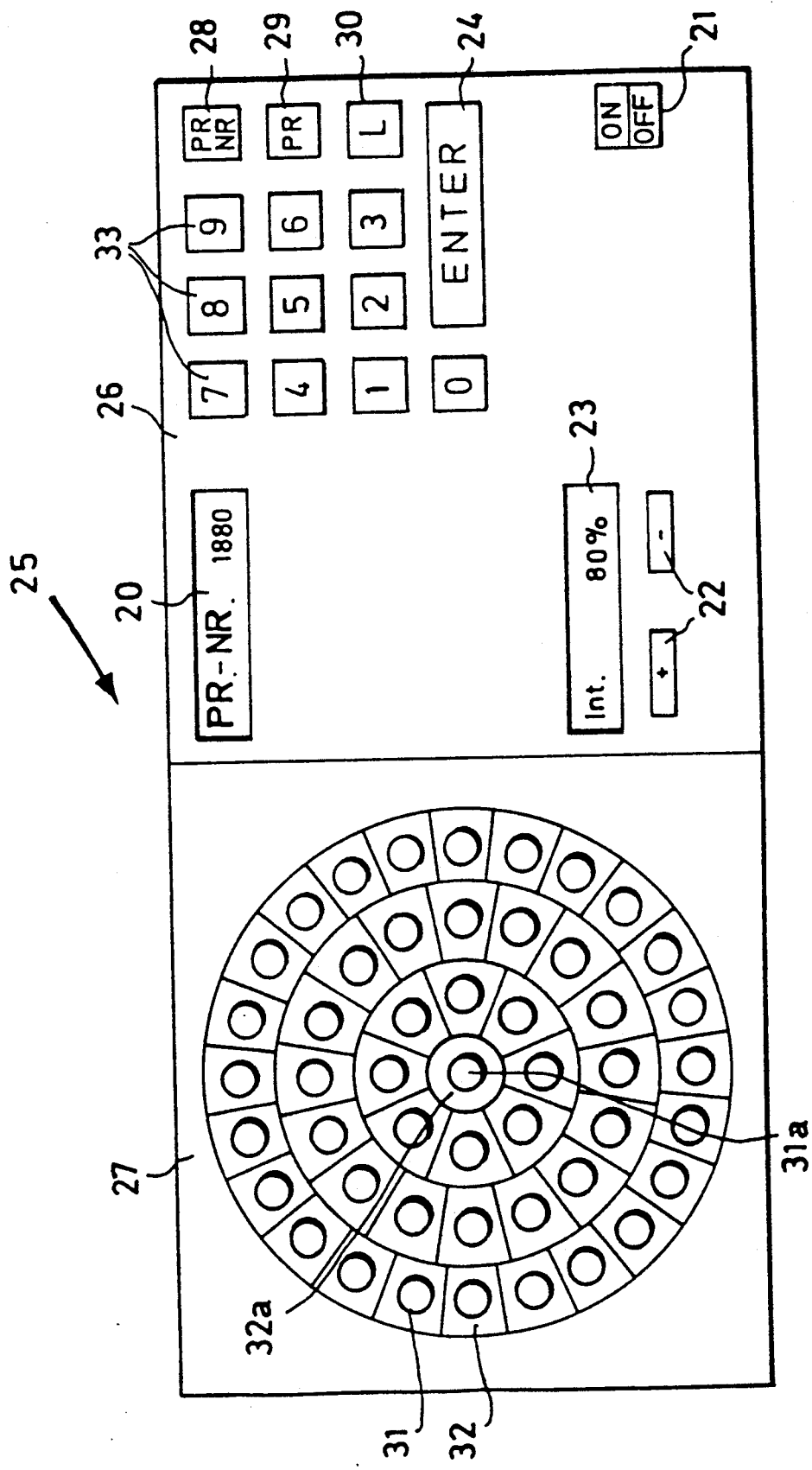

ILLUMINATING ARRANGEMENT FOR ILLUMINATING AN OBJECT WITH INCIDENT LIGHT

FIELD OF THE INVENTION

The invention relates to an arrangement for illuminating an object with incident light which includes a plurality of individual light sources and which requires no mechanical adjusting elements for a viewing device.

BACKGROUND OF THE INVENTION

For three-dimensional objects, the illumination at an angle of incidence leads to the formation of shadows and thereby significantly increases contrast during viewing.

German Patent 28 52 203 discloses an illuminating arrangement which includes a planar holding ring having light conductor end faces with the holding ring being disposed in the tube of the objective symmetrically about the optical axis in an outer annular region. Light from the end faces of the light conductors exits therefrom parallel to the optical axis. This holding ring is displaceable in the tube so that the angle of incidence of the light can be changed by a movement of the holding ring. In this arrangement, it is a disadvantage that it is necessary to mechanically adjust the holding ring in order to obtain a change in the irradiation angle. The inner arrangement of the light conductor end faces makes it necessary to provide a very large ocular lens and furthermore leads to stray light in the tube. The use of many light conductors is also disturbing. These conductors must be brought in from the outside and their ends have to be precisely machined.

A ring-shaped illuminator for an ophthalmometer is disclosed in U.S. Pat. No. 4,666,269. In this ophthalmometer, a cylinder lens is provided which is made up of several concentric rings and has a plurality of circularly-shaped openings at its rearward end in the rearward focus. The ophthalmometer further includes a light source which can comprise a plurality of small light sources and the light of the light source is directed by the cylinder lens in parallel rays onto an eye with the center point rays meeting at a point on the optical axis. It is a disadvantage of this illumination that no selection of different illuminating angles or illuminating sectors is possible since the undirected light of the light source enters the lens through fixed diaphragms.

A multi-directional surface illuminator is disclosed in U.S. Pat. No. 4,567,551 wherein the light of each light source is deflected onto a zone plate via a mirror mounted at an angle. The mirror is arranged outside of the fitting holding the objective. The zone plate then focuses the light in a region surrounding the optical axis. With this surface illuminator, it is a disadvantage that the light enters from outside and that there can be no selection of the illuminating angle.

U.S. Pat. No. 4,706,168 discloses an illuminating arrangement wherein the light of a plurality of light sources is focused parallelly to the optical axis via two reflector rings into an object plane in a region around the optical axis. The light sources can be also limited to sectors and are disposed in a ring around the optical axis of an objective outside of the holder holding the objective. A change in the illuminating angle is possible by means of a mechanical adjustment of one of the two reflector rings. The significant disadvantage of this arrangement is the necessity of a mechanical adjustment in order to obtain a change of the illuminating angle. The reflecting surfaces are complex to process and this is a further disadvantageous characteristic of this illuminating arrangement.

Published German patent application DE-OS 37 34 691 discloses an illuminating arrangement for a microscope wherein a plurality of semiconductor light sources are arranged in two dimensions and therefore in a plane to form a planar light source. A control circuit is connected to the planar light source and, in association with the selection of the illuminating mode, permits the illumination of selected individual light sources or individual light source combinations. With reference to this planar light source, an optical illuminating system is arranged in alignment and collects the light emanating from the planar light source and directs this light from below onto a transparent specimen. The disadvantage of this arrangement is that it is only for transmitted light and therefore only suitable for transparent specimens. Furthermore, an optical illuminating system is required which is arranged in alignment with the planar light source and this leads to an illuminating arrangement which requires a very substantial amount of space.

An illuminating arrangement having a Lieberkuhn mirror is shown in the text entitled "ABC der Optik" by Karl Mutze, Verlag Werner Dausien (1961) on page 561. In this illuminating arrangement, the light radiated in around the object is focused by the mirror onto a region surrounding the optical axis. The light radiation is here parallel to the optical axis.

SUMMARY OF THE INVENTION

It is an object of the invention to provide an illuminating arrangement which is suitable for illumination at various selectable illuminating angles with incident light without the need for a mechanical adjustment of the light sources or imaging elements.

The illuminating arrangement of the invention illuminates an object with incident light and is for a viewing and imaging device. The viewing and imaging device has an optical axis which intersects an object plane defined by the object. The illuminating arrangement includes: a plurality of individual light sources defining respective beam axes; a mounting structure for mounting the light sources in a geometric array defining a geometric array center coincident with the optical axis of said device and for holding the light sources so as to cause the beam axes to intersect the optical axis in the object plane; and, control means for controlling the light sources individually and in combination as to their respective intensities for a specific object.

With this arrangement for illuminating an object with incident light, an optical measurement can be made very quickly and independently of environmental influences such as extraneous light. The light sources are arranged about the optical axis in an array which is at least two-dimensional and prevent the heat in the tube from having negative effects. An illumination occurs from above so that the area of application includes all three-dimensional objects independently of their transparency. A variable illumination of the objects with selectable angles of illumination can take place without motoric adjustment. The alignment of the individual light sources is such that the optical axes of the light sources intersect in a point on the optical axis of the viewing optic in the object plane. In this way, an optimal illumination of the object region taken in by the objective of the illumination apparatus is assured. This is facilitated in that the optical axis of the illuminating imaging optic passes through the geometric array center.

According to the invention, illumination intensities are obtained which are selectable from all illuminating directions with freely selectable changes of the angle of incidence of the light without a mechanical adjustment since the light sources irradiate their light along different beam axes. In this way, a controllable illumination specific to the object is obtained for each individual light source and also for a combination of the light sources for different illuminating directions since the individual light sources in two-dimensional arrays have a different distance from the geometric array center. The array of the individual light sources can be advantageously configured so that several single individual or collective controllable light sources can be arranged in several concentric circles in different planes. The light sources can be self-luminous devices such as temperature radiators or luminescence radiators but can also include glass fibers, light-conducting rods or diaphragms illuminated from behind such as miniature halogen lamps, miniature stratoscope lamps, ultrabright light-emitting diodes and the like.

The array of the light sources is in at least two dimensions and in this array spatial light modulators can be provided which can be driven electronically. These light modulators can be realized as miniature projectors and can project selectively a specific pattern onto the measurement plane or simply illuminate the scene.

It is advantageous to arrange several of these spatial light modulators within the array symmetrically to the optical axis of the imaging system. In accordance with the selection of the light modulators, the light structures imaged onto the object can be selected specifically for the object.

An increase of the selection possibilities with respect to illumination is obtained in that the light sources, which are arranged in a circle in different planes are subdivided into several sectors and each sector can be separately switched. This makes possible an illumination from one side and therefore provides a deliberate formation of shadows. The light intensity of the light sources is controllable in order to obtain an adjustment possibility of the illumination on different objects. In this way, a different illumination is possible from different directions and at different angles. This embodiment can be advantageously realized with miniature halogen lamps because these lamps are adequately small and yet generate a white light. It is advantageous if a focusing lens is available ahead of each light source in order to obtain a high luminescence in a limited region. Many commercially available miniature light sources already have an integrated lens.

The individual light sources can be aligned ab initio in the radiation direction in order to avoid the need for an optical element for deflecting the light onto the area to be illuminated. A hemispherically-shaped carrier is suitable as a mounting body for this purpose and the individual light sources can be mounted on the inner surface thereof. It is advantageous if all individual light sources have the same spacing from the center of the illumination field. This makes possible that all individual light sources have the same focusing lens. In this way, a uniform spacing of the individual light sources from the luminescent field is obtained if the center point of the inner radius of the carrier lies at or near the object plane of an imaging optic connected to the illumination arrangement. Since all beam axes of the individual light sources are perpendicular to the inner side of the carrier, a simple assembly of the individual light sources on or in the carrier is possible. The form of the hemispherically-shaped carrier can be an entire hemisphere, a spherical section or a spherical layer in dependence upon the desired angular range for the illumination. The space between the light sources can be interrupted for the purpose of ventilation and also for optical control by the service personnel whereby the light sources can then be accommodated in extension arms or in wheel-like configurations.

The carrier material can be hard or it can be very soft. If very soft, it can be reinforced by supporting elements on the light sources and by connecting elements between the supporting elements. An additional protection against collision is provided if the material is soft. This is especially desirable when used on optical probes for coordinate measuring apparatus.

If light sources are used which emit light in a narrow spectral range, the imaging optics have to be corrected only for this limited spectral range. For suppressing extraneous light, it is then appropriate to additionally provide an interference-bandpass filter in the beam path of the imaging optic with this filter being matched to the spectral range of the light sources.

With this illuminating arrangement, a great many types of illumination are possible such as diffuse illumination, solid angle selective bright-field/dark-field illumination and structured illumination. For this reason, manually operating means and/or fully automatic operating means are available for driving. A manual drive is achieved by an operating console connected to the illuminating arrangement. In this operating console, means for driving the light sources as well as means for indicating the light sources switched on are provided. The storage of the selected type of illumination takes place in a memory unit and the type of illumination is indicated on the indicating arrangement. The activation of the individual light sources takes place via push buttons on the front plate of the input unit. The push buttons are arranged on the front plate in correspondence to the light sources and control light-emitting diodes which light when the light source is switched on. Each light source can be individually set with respect to its luminescence. Additional push buttons make it possible to program different illuminating settings.

To eliminate object surface characteristics which falsify measurement results, it is advantageous that the drive and the control of the light sources and, if provided, of the light structure projectors is obtained by means of an image processing unit in a closed control loop with the image processing unit advantageously being a knowledge-based unit. A knowledge-based image processing unit is understood to be a unit which makes it possible to adjust the illumination of the object specifically with respect to the object. The unit achieves this either with the aid of a priori knowledge (templates) and/or by means of different algorithms (image illuminating algorithms, illuminating combination algorithms and the like) which can be alternately retrieved. The a priori knowledge is available to the image processing unit after a teach-in procedure or from a CAD-unit with the object scene as well as also the illumination configuration corresponding thereto being stored. If further progress by means of a template is not possible or if there are no templates present, an optimal illumination can also be obtained by means of a hierarchical search process, different image processing algorithms and illuminating adjustments (illumination intensity, illumination directions). In this way, the image processing unit achieves also a certain redundance capability so that, for example, shadow edges can be distinguished from grooves by means of a comparison of two different illuminating adjustments.

A simple adaptability to different image processing algorithms is obtained especially by means of an arrangement of light sources and structure projectors in planes perpendicular to the optical axis.

The light structure projectors are especially suitable also to the assembly of an active automatic focusing arrangement. For this purpose, at least two light projectors are necessary which can be disposed opposite each other in the same plane perpendicular to the optical axis of the viewing optics. With this automatic focusing arrangement, a precise z-guide variable for the z-actuator is obtained. This is especially important when using the illumination arrangement in a measuring apparatus having an optical probe head.

BRIEF DESCRIPTION OF THE DRAWINGS

The invention will now be described with reference to the drawings wherein:

FIG. 4 is a front plate of an input unit for driving the individual light sources of FIG. 1;

DESCRIPTION OF THE PREFERRED
EMBODIMENTS OF THE INVENTION

Figure 1:
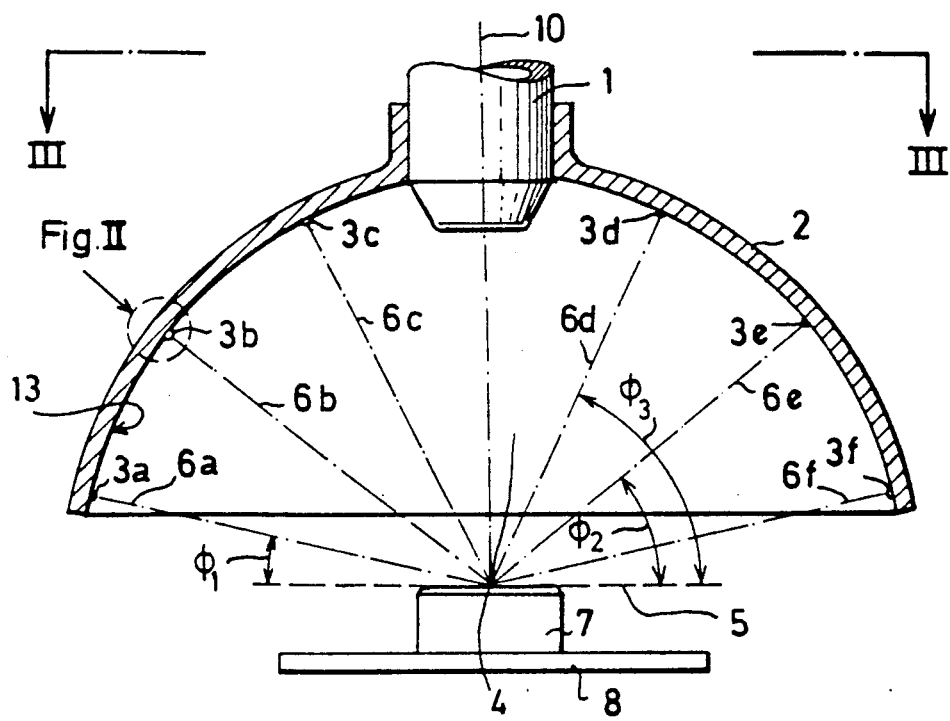
FIG. 1 is a side elevation view, partially in section, of a ring-shaped illuminating arrangement utilizing a hemispherically-shaped carrier body on a microscope tube or on an optical probe head for a coordinate measuring apparatus.

FIG. 1 shows a section taken through the tube 1 of a microscope on which a hemispherically-shaped carrier 2 of an illuminating arrangement is attached. The arrangement shown can, for example, be utilized also for an optical probe head on a coordinate measuring apparatus wherein the hemispherically-shaped carrier of the illuminating arrangement is attached.

A plurality of miniature lamps 3 is arranged inside the carrier 2 as individual light sources in concentric circles with the circles being arranged in different planes. The miniature lamps radiate at a defined value $\phi$ from each circle. The form of the carrier 2 is so selected that the center point 4 of the inner radius of the inner side 13 lies at or close to the object plane 5 of the imaging optics in the tube 1 of the microscope with the imaging optics being connected to the illuminating arrangement. The miniature lamps 3 project out of the inner side 13 of the carrier 2 and are so aligned that their beam axes (6a to 6f) are perpendicular to the inner side 13. The illuminating arrangement is correctly attached to the tube 1 if the center point 4 of the inner radius is as close as possible to the intersect point of the optical axis 10 with the object plane 5. The attachment of the carrier 2 on the tube 1 can be freely selected in accordance with the state of the art as long as the alignment of the carrier 2 relative to the tube 1 permits this requirement to be fulfilled. The beam axes (6a to 6f) then meet in the center point 4 on the optical axis 10. When viewing an object 7 on an object stage 8 through the imaging optics in the tube 1 of the microscope, the point 4 on the optical axis 10 and a region about the latter are optimally illuminated. The region around the center point 4 results from the geometric relationships of the carrier 2 (distance of the miniature lamps 3 to the center point 4) in reference to the directional characteristic of the miniature lamps 3 (radiation cone of the miniature lamps 3). The directional characteristic of the miniature lamps 3 is determined by a focusing lens 16 (FIG. 2a) on the miniature lamps 3.

A different illumination of the object 7 at different angles $\phi$ is obtained in that specific miniature lamps 3 radiate and others do not. The object 7 is only irradiated from one side at an angle $\phi_1$ if the object 7 is illuminated with only one miniature lamp such as lamp 3a. The possibility is also provided that the object 7 can be irradiated with all miniature lamps (3a and 3f) which are mounted in a concentric circle about the optical axis 10. In dependence upon the number of miniature lamps 3 on one such circle, an illumination from several different sectors can be realized in that a preselected number of miniature lamps 3 disposed one next to the other irradiate the object 7 in common.

The light intensity of each individual miniature lamp 3 is individually controllable so that the illumination can be adapted to the different surface structure of the objects 7. The miniature lamps 3 can be configured as halogen lamps, LED's and the like.

Figure 2A:
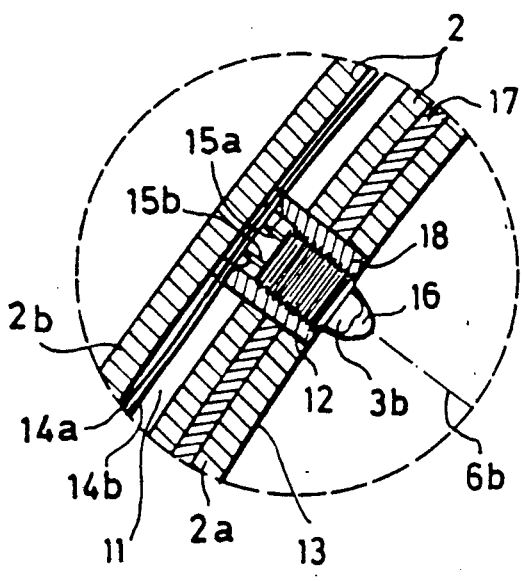
FIG. 2a is a detail view showing the mounting of a miniature lamp such as a halogen lamp.

FIG. 2a is an enlarged view of a miniature lamp 3b and the immediate region surrounding the same. FIG. 2a shows that the carrier 2 comprises an inner half-shell 2a and an outer half-shell 2b. A lamp fitting 12 is threadably engaged in the inner half-shell 2a wherein a miniature halogen lamp 3b is disposed as an individual light source. A hollow space 11 is provided between the inner half-shell 2a and the outer half-shell 2b and the electrical connections (15a, 15b) of the lamp fitting 12 extend into this hollow space. These connections (15a, 15b) are connected to the electrical supply lines (14a, 14b).

The lamp fitting 12 is aligned perpendicularly to the inner side 13 of the inner half-shell 2a. This has several advantages. A bore perpendicular to a surface and provided for a lamp fitting 12 is the easiest to produce during manufacture. All miniature lamps 3 can have the same focusing lens 16 because of the same distance of all miniature lamps 3 to the center point 4. In this way, all miniature lamps 3 illuminate at all angles ($\phi_1$ to $\phi_3$) almost the entire region on an object 7. The word "almost" is here used because different conical sections of the radiation cones on the object 7 form the illuminating fields and the differences resulting therefrom in the illumination intensity can be compensated for by a control of the light intensity of each individual miniature lamp 3 in common with the fluctuations resulting from manufacture of the light intensity of the individual miniature lamps 3.

The inner side 13 of the inner half-shell 2a is not mirrored since an illumination at exact angles is intended so that no undesired reflections from the object are reflected back to the object. The material of the carrier 2 is itself very soft so that the object is not damaged by an unintended impact on the object. The lamp fittings 12 are mounted in a ring 18 so that the carrier nonetheless has the required strength with the ring 18 being made of a material having adequate strength. These rings 18 are connected with each other by elastic rods 17 made of the same material with a suitable material being steel or hard plastic.

Figure 2B:
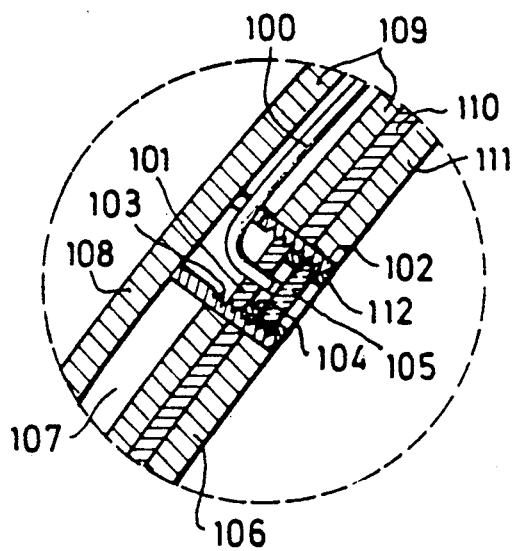
FIG. 2b is a detail view of an embodiment wherein a light conductor is substituted for the miniature lamp.

In the embodiment of FIG. 2b, the miniature lamps 3 are replaced by light conductors 100. The carrier 109 here too comprises an inner half-shell 106 and an outer half-shell 108 with the material of the carrier 109 being very soft. For this reason, the inner half-shell 106 is reinforced by elastic rods 110 which connect the rings 102 with each other. These rings 102 are provided for mounting the light conductors and also brace the outer half-shell 108 so that a hollow space 107 is provided between the half-shells (106, 108).

In this hollow space 107, the light conductors 100 are led to the rings 102 which have an opening for the light conductors 100 so that the light conductors 100 can be guided into the interior of the ring 102. In the inside of the ring 102, an internal thread 103 is provided into which the outer winding of an alignment element 101 for the light conductor 100 is threadably engaged. This alignment element 101 ensures that the light conductor 100 terminates in a direction perpendicular to the inner side 111 of the inner half-shell 106. A focusing lens 105 is disposed ahead of the light conductor 100 and is fixed at both ends by two holding rings (104 and 112). The focusing lens 105 assures that the light emanating from the light conductor 100 is concentrated in the object plane in a region around the optical axis.

Figure 3A:
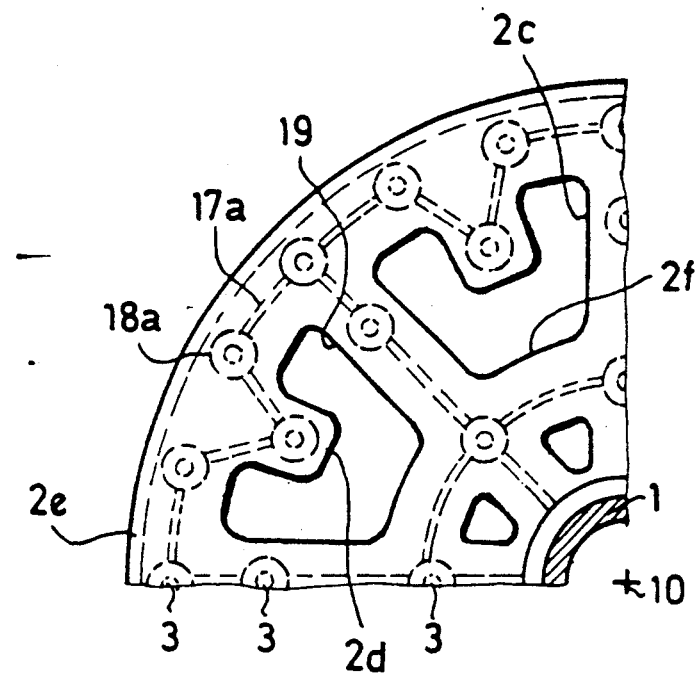
FIG. 3a is a plan view showing a portion of the illuminating arrangement of FIG. 1.

FIG. 3a is a plan view of a portion of the carrier 2 of FIG. 1 arranged around the microscope tube 1. The carrier 2 is configured in the form of a wheel and has several spokes 2c which are connected to each other by circular segments (2e, 2f) at different distances to the optical center point. Furthermore, extension arms 2d are provided between the spokes 2c and in this embodiment are formed on the outer circular segments 2e. The miniature lamps 3 of the type shown in FIGS. 1 and 2 are mounted on this carrier 2. The material of the carrier 2 is very soft and can be made from soft rubber, for example. For this reason, the lamp fittings 12 (FIG. 2a) of the miniature lamps 3 are attached in a ring 18 made of harder material such as steel or hard plastic. These individual rings 18 are connected with each other by rods 17 (FIG. 2a) made of the same material. This connection of the rods 17 is so conceived that they permit a distortion of the carrier 2. This permits all advantages to be retained which are provided by the soft material of the carrier 2 even after reinforcement by the rods 17.

Openings 19 are provided between the individual parts (2c, 2d, 2e) of the carrier and permit air heated by the miniature lamps 3 to escape. This is especially necessary for the illumination of temperature-sensitive objects but it also acts to reduce the operating temperature of the lamps 3 and so leads to a longer service life of the miniature lamps 3 utilized.

Figure 3B:
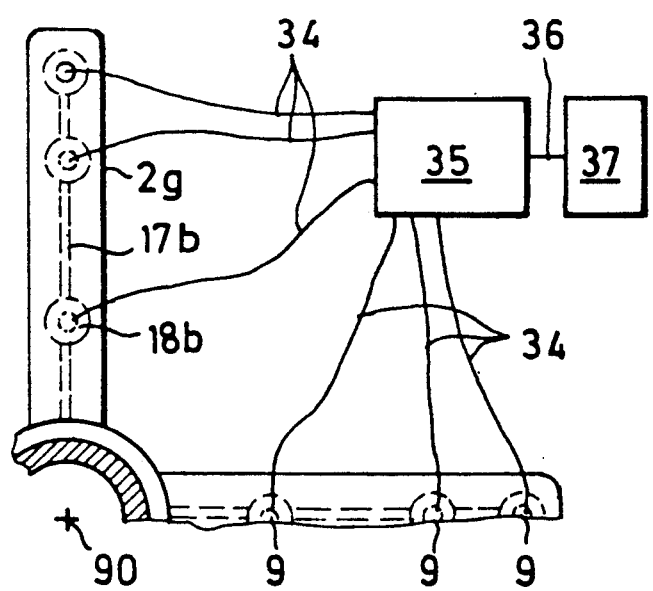
FIG. 3b is a plan view of a portion of an illuminating arrangement wherein the light sources are mounted on spokes.

If only a few illumination directions and illumination angles are needed, the light sources 9 in FIG. 3b can also be mounted on spokes 2g. In this embodiment also, the configuration of the spokes 2g as rings 18b and rods 17b made of hard material having a soft encasement is purposeful for providing a protection against collision. The special advantage of this embodiment is seen in the large free field of view through the carrier 2g onto the illuminated object. The optical axis is identified by reference numeral 90.

Each light source 9 is connected to the control circuit 35 of the illuminating arrangement via electrical lines 34. The control circuit 35 can switch in each light source 9 separately and individually control its light intensity. An operating console 37 is connected to the control circuit 35 via a cable 36. The operating console 37 includes means for driving the light sources 9 and for indicating the light sources 9 which are switched on.

Ultra-bright light-emitting diodes can also be used as light sources. These diodes are characterized by their high light intensity as well as by a narrow spectral bandwidth. The following light-emitting diodes are listed as examples:

|  | Power Dissipation | Peak Emission Wavelength | Spectral Bandwidth at 50% |
| --- | --- | --- | --- |
| SUR-150 (Oshino) | 55 mW | 660 nm | 25 nm |
| TLRAI 50 (Toshiba) | 55 mW | 660 nm | 25 nm |
| OD-50L (Opto Diode Corp.) | 600 mW | 880 nm | 80 nm |
| OD-50W (Opto Diode Corp.) | 1000 mW | 880 nm | 80 nm |
| OD-100 (Opto Diode Corp.) | 1300 mW | 880 nm | 80 nm |

This radiation characteristic is taken as the basis for a corrective computation of the imaging optics in the microscope tube in order to obtain an optimal imaging. At the same time, the types of glass for producing the imaging optics are so selected that a maximum transmission takes place in the spectral bandwidth. In order to eliminate external light influences, an interference bandpass filter is also provided in the microscope tube. This filter preferably passes the spectral range emitted by the light-emitting diodes and weakens the radiation outside of the selected spectral range. The ultra-bright light-emitting diodes are suitable especially for use together with a CCD-camera in the beam path of the microscope tube 1.

FIG. 4 shows the front plate 25 of a control unit for the illuminating arrangement of a microscope according to FIG. 1. The drive unit per se is configured as generally known so that a plurality of miniature lamps can be driven and the front plate 25 functions as an input and indicating arrangement.

The front plate 25 is subdivided into two regions (26, 27). In the first region, push buttons 32 having light-emitting diodes 31 are arranged circularly and correspond to the number of miniature lamps 3 (FIG. 1). An extra push button 32a having a light-emitting diode 31a is provided for providing incident light. By pressing the push buttons 32, the miniature lamps 3 (FIG. 1) are selected and simultaneously switched on and off. If a miniature lamp 3 is switched on and selected by pressing its push button 32, then the light-emitting diode 31 on the push button lights up in order to indicate the operation of the miniature lamp 3. At the same time, the light intensity of the miniature lamp 3 can be changed via plus-minus keys 22 in the second region 26. The longer the key 22 is pressed, the faster the change takes place. The set value of the light intensity (0 to 100%) appears on the indicator 23. If several push buttons 22 are pressed simultaneously or if a push button 32 is pressed constantly while the other push buttons 32 are pressed, then several miniature lamps 3 can be simultaneously changed in their light intensity.

By selecting another miniature lamp 3 by again pressing a push button 32, the set value is temporarily stored in a memory of the drive unit and the newly selected miniature lamp 3 can be set with respect to its light intensity without influencing the previous setting. In this way, each miniature lamp 3 can be set individually or in groups with respect to its light intensity for an illumination. If a setting is to be cancelled, the corresponding push button 32 must be pressed whereby the light-emitting diode 31 goes out and the miniature lamp 3 is switched off. By again pressing the push button 32, the miniature lamp 3 is again switched on and can be again set with respect to its light intensity via the plus-minus keys 22.

However, the possibility is also provided that several illuminations can be sequentially stored and again be called up. For this purpose, an illumination is set in the manner described. Once this is done, then the PR-NR key 28 is pressed and assigns a number to the set illumination with the number keys identified by reference numeral 33. This number is given for the set illumination and is indicated on the indicator 20. By pressing the enter key 24, the storage of the illuminating setting takes place under the selected number with an earlier setting being overwritten by the same number.

This procedure can be repeated several times and a program can be sequentially inputted having several illuminating settings. If a program step is to be cancelled, then the corresponding number is set with the PR-NR key 28 and the number keys 33 on the indicator 20 whereafter the L-key 30 is pressed.

If it is intended that the program be run through, then the program step is set with which one intends to begin and the PR-key 29 is pressed in order to obtain the next illumination setting having the next higher program number. An on/off switch 21 is provided on the front plate 25 by means of which the miniature lamps on the carrier 2 (FIG. 1) and the incident light through the tube can be simultaneously switched off.

Figure 5:
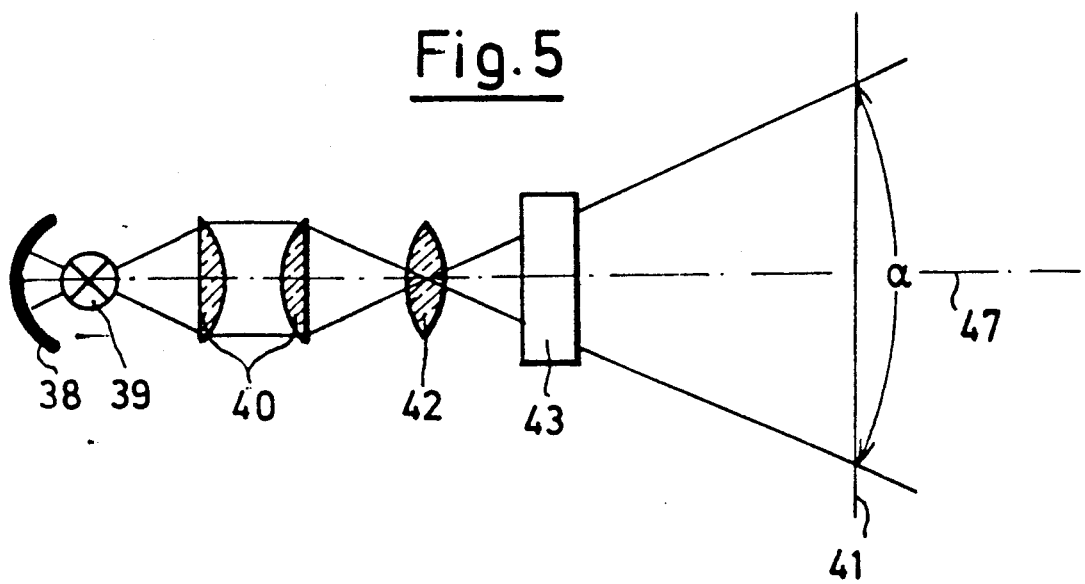
FIG. 5 is a schematic representation of a miniature projector.
Figure 6A:
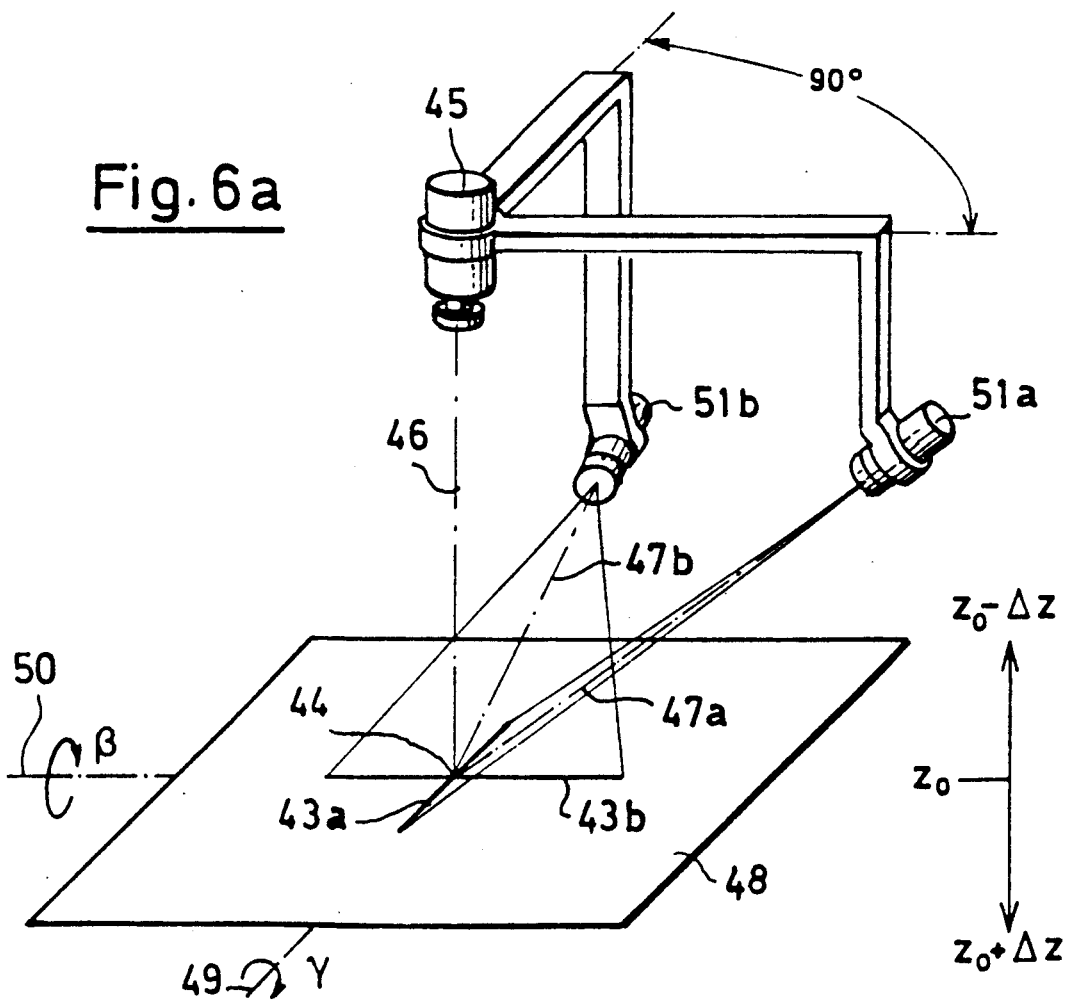
FIGS. 6a to 6e is a set of views for explaining the use of the miniature projectors for automatic focusing.
Figure 7A:
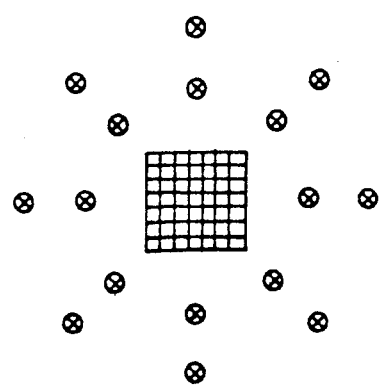
FIG. 7 is a schematic representation of a fully automatic illuminating arrangement; and, FIG. 7a is an arrangement of the illuminating light sources in the illuminating arrangement of FIG. 7.
Figure 7:
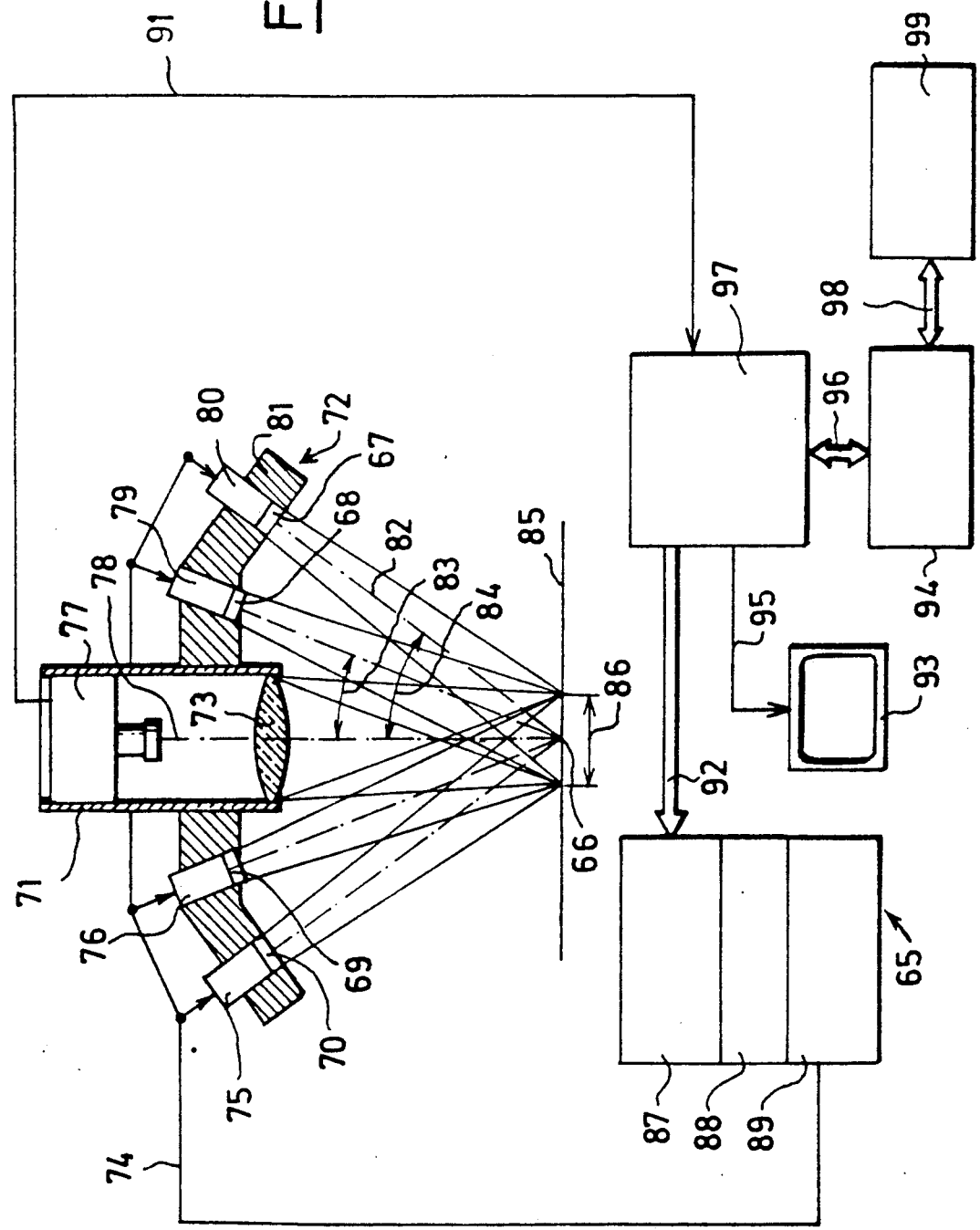

FIG. 5 shows the discrete configuration of a light source which is used in the embodiments of FIGS. 6a and 7. This light source is used as a miniature projector. The white light of a filament 39 is directed from a reflector 38 configured as a concave mirror onto a condensor 40 comprising two planar-convex lenses. The condensor 40 images the divergent ray bundle emanating from the filament 39 onto the center of the projection lens 42. A spatial light modulator 43 is located forward of the projector lens 42 as shown. The light modulator 43 can for example be a two-dimensional pyrope-pixel structure on a non-magnetic transparent substrate with the pyrope-pixel structure being triggered by the magnetic field of a drive current. The polarization direction of the light passing through is rotated in the clockwise direction or counterclockwise direction in dependence upon the magnetization direction of the pixels (Faraday effect). In this way, individual pixels are switched between "bright" and "dark" with a polarizer-analyzer combination. The image information stored in the light modulator requires no energy (permanent memory) to be maintained. The light modulator 43 is configured as a chip having a surface array such as 256×256. The switchover duration per pixel lies below 1μ second. In this way, the light source can be switched on and off very rapidly without it being necessary to change the current through the filament 39. Furthermore, a line pattern required for an optical measurement or a discrete line can be imaged with this arrangement very easily and very quickly onto the projection plane 41.

For example, a reticle can be provided on a measuring plane 48 if two of the light sources (51a and 51b) of FIG. 5 are built into an illuminating arrangement on an optical probe head 45 of a measuring machine. This configuration is shown in FIG. 6a. The measuring projectors (51a and 51b) are displaced by an angle of 90° from each other on a plane perpendicular to the optical axis 46 of the optical probe head 45. The optical axes (47a and 47b) of the light sources (51a and 51b) intersect the optical axis 46 of the optical probe head 45 at point 44. If the measuring plane 48 is orientated precisely perpendicularly to the optical axis 46 of the probe head 45, the two lines (43a and 43b) of the light sources (51a and 51b) meet precisely at this point 44 and define a cross which has legs of equal length with each two mutually adjacent lines (43a and 43b) defining an angle of 90°. Another angle occurs only when the measuring plane 48 is tilted by an angle $\beta$ or $\gamma$ in the x-direction or y-direction identified by reference numerals 50 and 49, respectively. The z-direction is fixed by the optical axis 46 of the optical probe head 45.

Figure 6B:
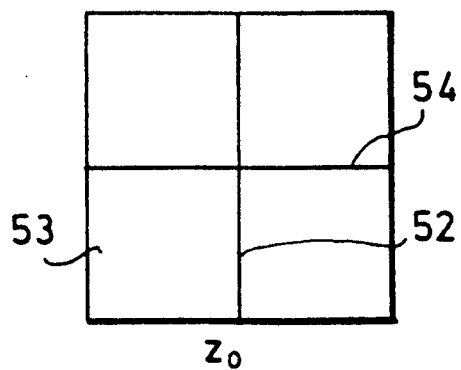
Figure 6C:
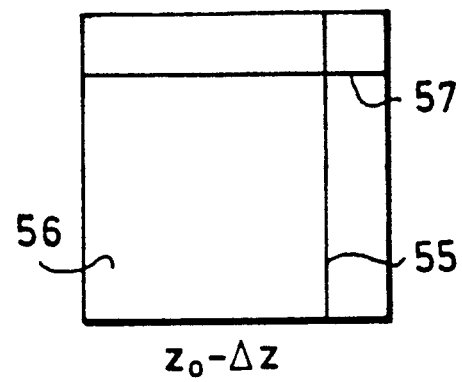
Figure 6D:
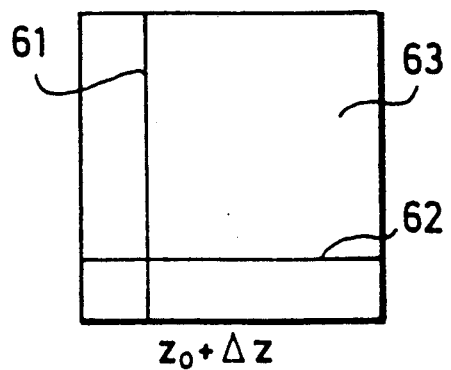
Figure 6E:
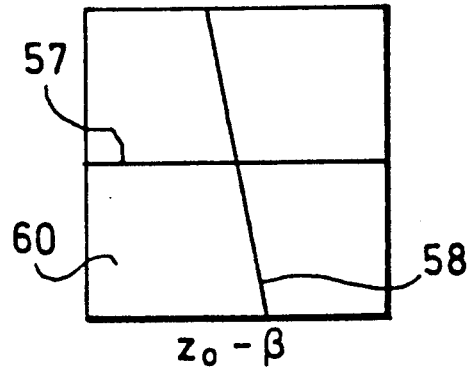

FIGS. 6c to 6e show the image which is obtained for the probe head 45 when the probe head is not precisely in the optimal plane with reference to its measurement plane 48. All orientations of the lines self-orientate in an arrangement according to FIG. 6a.

In FIG. 6b, an image is once again shown which is projected by the two measuring projectors on a measuring plane at a distance $z_o$ from the probe head ($\beta=0$ and $\gamma=0$). The two lines (52, 54) generated by the measuring projectors meet precisely at the center of the detected image section. The image according to FIG. 6c is provided when the measuring plane 56 is too close. Then the distance between the measuring plane 56 and the optical probe head is no longer $z_o$, but is instead ($z_o-\Delta z$).

The two projected lines (55, 57) migrate together displaced by the same amount into a corner of the detected image section. At ($z_o+\Delta z$), the image of the measuring plane 63 shown in FIG. 6d is obtained. The two projected lines (61, 62) then migrate together displaced by the same amount into the opposite-lying corner of the detected image section.

FIG. 6e shows which image of the measuring plane 60 occurs when the measuring plane is tilted by the angle $\beta$. Then the one projected line 57 remains in its initial position while the other projected line 58 takes on a position inclined with respect to the first line 57. The same is true when the measuring plane is tilted about the angle $\gamma$ or with a combination of the shown orientations of the measuring plane.

In FIG. 7, an illuminating arrangement 72 is mounted on an optical probe head 71 of a measuring machine. This probe head 71 includes a CCD-camera 77 and an objective 73. The field of view 86 about the optical axis 78 of the probe head 71 is illuminated by the light sources (75, 76, 79, 80) which surround the probe head 71 in two concentric circles. The light sources (75, 76, 79, 80) radiate their light at different angles (83, 84) into the field of view 86 so that different shadows are thrown for three-dimensional objects if either only the light sources (76, 79) in the inner circle or only the light sources (75, 80) on the outer circle emit light. Each of the light sources (75, 76, 79, 80) can be individually adjusted as to its intensity so that a total reflection in the direction toward the CCD-camera 77 does not occur because of specific light sources (75, 76, 79, 80).

All light sources (75, 76, 79, 80) are held by one carrier 81 which is releasably attached to the optical probe head 71. So that all light sources (75, 76, 79, 80) having the same structural configuration can generate the same light intensity in the field of view 86 and illuminate the same region, the carrier is formed so that the light sources (75, 76, 79, 80) are all mounted on a spherical shell arranged about the intersect point 66. Each circle of light sources (75, 80 and 76, 79) comprises eight light sources of which light sources (75, 76, 79, 80) can be seen in FIG. 7. Each two mutually adjacent ones of these light sources are at a spacing of 45° from each other and are aligned in correspondence to the geometric configuration of the CCD surface sensor in the CCD-camera 77. This alignment is shown schematically in FIG. 7a wherein eight light sources are arranged in each of two circles around the CCD surface sensor. The arrangement was selected in correspondence to FIG. 7a since this type of illumination affords the best results for the Sobel algorithm for the edge detection for the image evaluation. The optical axes 82 of the light sources (75, 76, 79, 80) all intersect in a point 66 on the optical axis 78 of the probe head 71. If this point 66 lies in the object plane 85, then a sharp image of the object plane 85 is imaged on the CCD-camera 77.

Drivable light modulators (67, 68, 69, 70) are disposed ahead of respective ones of light sources (80, 79, 76, 75) and can generate a pattern from a pixel matrix (512×512).

The video signals of the CCD-camera 77 are supplied to the image processing unit 97 via the data line 91. The video signals are digitalized in the image processing unit 97 and then reach the image memory. The image processing unit 97 is connected via a data bus 96 to a control cabinet 94 of the measuring machine which, in turn, is connected to a central computer 99 via a data bus 98. All computer operations needed for image processing take place in the image processing unit 97. The control cabinet 94 controls all parameters associated with the measuring machine.

The operator of the measuring machine has access to the control cabinet 94 and to the image processing unit 97 via the central computer 99. The central computer 99 adjusts and determines all parameters required for the measuring process on an individual object to be measured. The values determined by the image processing unit 97 are made visible to the operator of the measuring machine by the image of the object surface 85 on an image monitor 93. The image monitor 93 is connected to the image processing unit 97 via a signal line 95. The illuminating control module 65 is connected to the image processing unit 97 via a data bus 92. The illuminating control module 65 comprises a projection-mode memory 87 wherein the different parameter adjustments for each illuminating setting are stored. These parameters include the light intensities for the respective light sources (75, 76, 79, 80) for each illuminating scene. Furthermore, the different settings of the individual light modulators (67, 68, 69, 70) for each illuminating scene are stored. The discrete digitalized parameters in the projection-mode memory 87 are called up pursuant to instructions from the image processing unit 97 and transmitted to the illuminating control electronics 89 via a digital-to-analog converter 88. The illuminating control electronic unit 89 is so configured that it can discretely set each individual light source (75, 76, 79, 80) and each individual light modulator (67, 68, 69, 70) via a conducting cable 74 in correspondence to the parameters predetermined by the image processing unit 97.

It is understood that the foregoing description is that of the preferred embodiments of the invention and that various changes and modifications may be made thereto without departing from the spirit and scope of the invention as defined in the appended claims.

What is claimed is:

1. An illuminating arrangement for illuminating an object with incident light, the illuminating arrangement being for a viewing and imaging device defining an optical axis and the object defining an object plane, the illuminating arrangement comprising:

a plurality of individual light sources defining respective beam axes;

a mounting structure for mounting said light sources in a geometric array defining a geometric array center coincident with said optical axis and for holding said light sources so as to cause said beam axes to intersect said optical axis in said object plane;

control means for controlling the light of said light sources individually and in combination as to their respective intensities for a specific object;

a plurality of spatial light modulators corresponding to respective ones of said light sources; and, said control means being connected to said spatial light modulators for electronically driving said light modulators.

2. The illuminating arrangement of claim 1, said geometric array being at least two-dimensional.

3. The illuminating arrangement of claim 1, said plurality of light modulates being a first plurality of light modulators, the arrangement further comprising a second plurality of spatial light modulators distributed in said array so as to be symmetrical with respect to said optical axis of said viewing and imaging device; and, each one of said second plurality of spatial light modulators being a light structure projector.

4. The illuminating arrangement of claim 3, each of said light structure projectors including means for imaging a light structure on the object which is selectable so as to be specific to the object.

5. The illuminating arrangement of claim 3, said control means including a knowledge-based image processing unit connected to said light sources and said light modulators in a closed control loop for controlling said light sources and said light modulators so as to eliminate surface characteristics of the object which falsify measurement results.

6. The illuminating arrangement of claim 3, said light sources and said light structure projectors being arranged in a single plane perpendicular to said optical axis and being disposed in said plane relative to each other so as to permit an adaptation to different image processing algorithms.

7. The illuminating arrangement of claim 3, said device being part of a measuring apparatus having a z-actuator and said device including an automatic focusing arrangement incorporating at least two of said light structure projectors for generating guide variables for said z-actuator.

8. The illuminating arrangement of claim 1, said individual light sources being respective miniature halogen lamps.

9. The illuminating arrangement of claim 1, said mounting structure being a hemispherically-shaped carrier defining an inner side facing toward said object plane; and, said individual light sources being fixedly mounted on said inner side.

10. The illuminating arrangement of claim 9, said inner side having a curvature defining a radius having a center located in or near said object plane.

11. The illuminating arrangement of claim 1, further comprising an operating console which includes said control means for controlling the light of said light sources.

12. The illuminating arrangement of claim 1, said control means including a knowledge-based image processing unit connected to said light sources in a closed control loop for controlling the respective intensities thereof; and, said image processing unit including means for eliminating surface characteristics of the object which falsify measurement results.

13. The illuminating arrangement of claim 1, said plurality of light modulators being a first plurality of light modulators, the arrangement further comprising a second plurality of spatial light modulators distributed in said array so as to be symmetrical with respect to said optical axis of said viewing and imaging device; and, each one of said second plurality of spatial light modulators being a light structure projector.

14. The illuminating arrangement of claim 13, said control means including a knowledge-based image processing unit connected to said light sources in a closed control loop for controlling the respective intensities thereof; and, said image processing unit including means for eliminating surface characteristics of the object which falsify measurement results.

15. The illuminating arrangement of claim 1, said control means including a knowledge-based image processing unit connected to said light sources and said light modulators in a closed control loop for controlling said light sources and said light modulators so as to eliminate surface characteristics of the object which falsify measurement results.

* * * * *

UNITED STATES PATENT AND TRADEMARK OFFICE
CERTIFICATE OF CORRECTION

PATENT NO. : 5,038,258
DATED : August 6, 1991
INVENTOR(S) : Klaus-Peter Koch and Reinhard Prinz It is certified that error appears in the above-identified patent and that said Letters Patent is hereby corrected as shown below:

In column 2, line 24: delete "Lieberkuhn" and substitute -- Lieberkühn -- therefor.

In column 2, line 26: delete "Mutze" and substitute -- Mütze -- therefor.

In column 12, line 46: delete "modulates" and substitute -- modulators -- therefor.

Signed and Sealed this

Fourteenth Day of September, 1993

Attest:

BRUCE LEHMAN

Attesting Officer     Commissioner of Patents and Trademarks